Jan. 16, 1951  P. B. WINSTON  2,538,491
TIRE CASING WITH IMPROVED TREAD
Filed Feb. 28, 1950

Philip B. Winston
INVENTOR.

BY *Clarence A. O'Brien*
and *Harvey B. Jacobson*
Attorneys

Patented Jan. 16, 1951

2,538,491

UNITED STATES PATENT OFFICE 2,538,491

TIRE CASING WITH IMPROVED TREAD

Philip B. Winston, Germantown, Tenn.

Application February 28, 1950, Serial No. 146,853

5 Claims. (Cl. 152—209)

1

The present invention relates to a pneumatic tire casing with a novelly constructed tread in which manufacturers, retailers and users will find their long felt needs fully met and aptly contained.

Another object of the invention is to provide a new kind of tread having especially designed and physically coordinated features which contribute their proportionate functions to minimize both lateral and fore and aft skidding, while, at the same time, insuring longevity and dependable and tenacious traction.

More specifically, I have evolved and produced an outstandingly different tire tread which is characterized by symmetrical rows, circumferentially and transversely, of tread-blocks. In this connection, I am not unmindful that tread-blocks of varying geometrical patterns are not broadly new, that molded tires have been made with separated blocks, ribs and the like. Then, too, such tread elements are produced by the gouging of grooves in molded tires having smooth surface treads.

In carrying out the principles of the present invention the desired tread-blocks, and these may vary in outline and design, are produced by using suitable knives and cutting longitudinal and transverse slits in the tread portion of the casing. However, and in so doing, the respective slits, both longitudinally and transversely, are obliquely cut so that the respective pairs of slits are divergent from the tread surface toward the body of the casing.

A tire tread constructed in accordance with the principles of the present invention is, therefore, unique in that the quadrilateral block formations take the form of truncated pyramids having their broad basal sides disposed outwardly to attain the desired traction and anti-skidding results.

Then, too, novelty is predicated upon the stated truncated pyramids whose undercut converging walls are surrounded and "fenced in" by V-shaped ribs which constitute squeegee elements and, in addition, minimize the possibility of the spaces between the blocks becoming choked with dirt, gravel and extraneous particles.

What is more, in addition to the truncated pyramidal blocks and encompassing V-ribs, small prismatic fillers are provided between the corresponding undercut ends of adjacent ribs.

Other objects and advantages will become more readily apparent from the following description and the accompanying illustrative drawings.

In the accompanying sheet of drawing, wherein like numerals are employed to designate like parts throughout the views:

2

Figure 2:
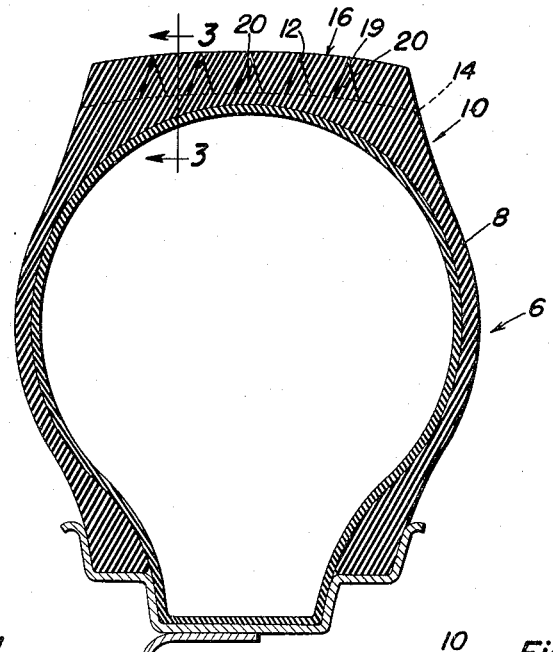
Figure 2 is a cross-section (showing complete tire and rim) taken on the plane of the vertical line 2—2 of Figure 1 looking in the direction of the arrows.
Figure 1:
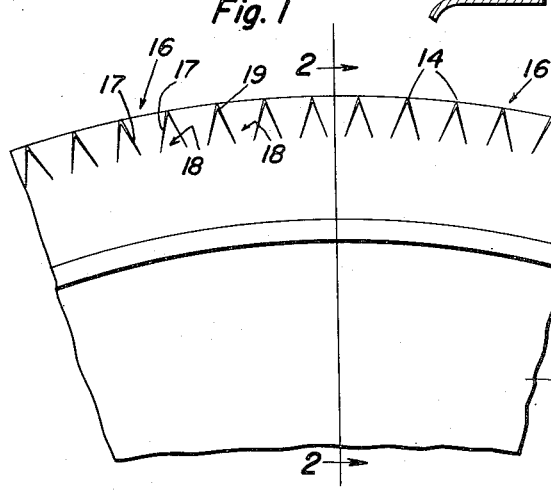
Figure 1 is a fragmentary side elevational view of a portion of a tire casing have a tread embodying the features of the instant invention.
Figure 4:
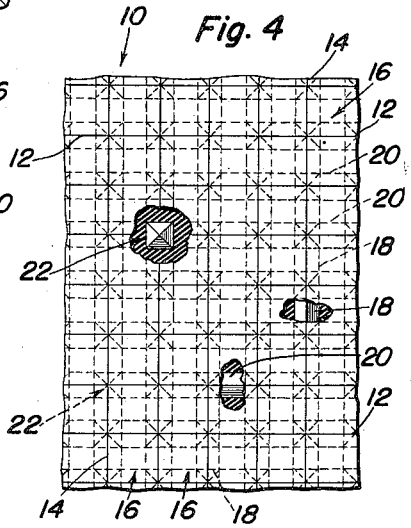
Figure 4 is a fragmentary plan view which serves to bring out the construction and relative association of tread-blocks and the intervening filler ribs and filler prisms or pyramids.
Figure 3:
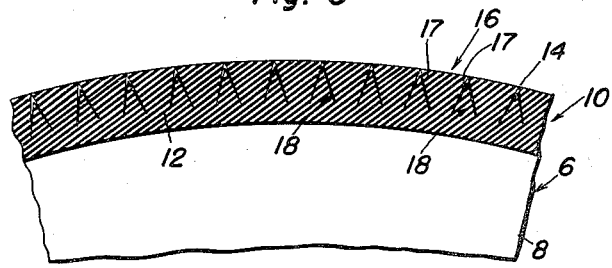
Figure 3 is a view at right angles, also fragmentary in type, taken on the vertical line 3—3 of Figure 2, looking in the direction of the arrows.

Referring now to the drawings, the tire casing, which is substantially conventional in construction, is denoted by the numeral 6. The side walls are denoted at 8 and the thickened tread by the numeral 10. All of the features are embodied in the tread 10. As shown in Figure 4, the tread is provided with circumferential spaced parallel or longitudinal slits 12 and right-angularly disposed transverse slits 14. These serve to divide the rubber into a multiplicity of rectangular (diamonds, triangles or the like) blocks. The blocks are here shown as square and will suffice to illustrate the construction and principles of the invention. The slits, instead of being at right angles, are obliquely cut (both longitudinally and laterally). In the circumstances, the principal elements left by so cutting the rubber define transverse and longitudinal rows of tread-blocks 16 which are, as stated, truncated pyramids with the broad sides facing outwardly. The rubber between the blocks serves to define a plurality of relatively pliant transverse V-shaped ribs 18 and longitudinal V-shaped ribs 20. It is obvious too, that the ends of the ribs, as a result of the slitting operations, are also undercut. Consequently, between the right angularly disposed sets or groups of longitudinal and transverse ribs, pyramidal fillers or projections 22 are also provided. It follows, therefore, that each block is in the form of a truncated pyramid and that its four undercut marginal walls or surfaces are surrounded by four V-shaped ribs and at the corners of each block the prismatic or pyramidal projections 22 intervene. On a straight road, the tire presents a straight surface to the road surface. On curves, the truncated pyramids will pivot on their reduced neck portions and present a flat surface to the road which, in conjunction with the ribs, will have a squeegee effect and will prevent skidding. The V-shaped ribs and peaked pyramids (18, 20 and 22, respectively), prevent the presence of objectionable spaces which would otherwise be likely to fill up with dirt and gravel.

As the tire wears down, the truncated pyramids will decrease in surface area, but, at the same time, the peaks of the pyramids 22 and vertices of the ribs 18 and 20 will wear gradually and uniformly, thus presenting the same amount of rubber surface during the entire life of the tire.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A tire casing of the class shown and described embodying a rubber tread having longitudinal slits and transverse slits intersecting the longitudinal slits, said slits being at right angles to each other and obliquely cut and defining a multiplicity of square-shaped truncated pyramids, and intervening longitudinal and transverse V-shaped ribs.

2. A tire casing of the class shown and described embodying a rubber tread having longitudinal slits and transverse slits intersecting the longitudinal slits, said slits being at right angles to each other and obliquely cut and defining a multiplicity of square-shaped truncated pyramids, intervening longitudinal and transverse V-shaped ribs, the ends of all ribs being undercut, and relatively small prismatic fillers between corresponding undercut ends of adjacent ribs.

3. A tire casing with a rubber tread embodying a multiplicity of truncated pyramidal traction blocks, each block being rectangular in top plan, having undercut plane marginal surfaces and being bordered by V-shaped ribs at right angles to each other, and pyramidal projections interposed between the undercut ends of the respective ribs.

4. A tire casing having a resilient tread provided with criss-crossed slits providing a symmetrical pattern of individual but uniform tread blocks, the marginal edges of the latter being inwardly undercut with each block defining a truncated pyramid, together with pliant V-shaped ribs interposed between the respective blocks, the latter, when spread apart, serving to expand the slits and expose said ribs, and said ribs serving as antiskid squeegees.

5. The structure set forth in claim 4, wherein said ribs, compared to said blocks, being of relatively small cross-sections and the vertices of said ribs being approximately flush with the traction surfaces of said blocks.

PHILIP B. WINSTON.

REFERENCES CITED

The following references are of record in the file of this patent:

UNITED STATES PATENTS

| Number | Name | Date |
| --- | --- | --- |
| 2,197,662 | Hughes | Apr. 16, 1940 |
| 2,264,767 | Ofensend | Dec. 2, 1941 |
| 2,294,626 | Overman | Sept. 1, 1942 |
| 2,302,027 | Havens | Nov. 17, 1942 |